United States Patent [19]

Malvern

[11] Patent Number: 4,815,321
[45] Date of Patent: Mar. 28, 1989

[54] MOVEMENT SENSING

[75] Inventor: Alan R. Malvern, Bracknell, United Kingdom

[73] Assignee: British Aerospace Public Limited Company, London, United Kingdom

[21] Appl. No.: 917,507

[22] Filed: Oct. 10, 1986

[30] Foreign Application Priority Data

Oct. 10, 1985 [GB] United Kingdom ............... 8525017
Feb. 8, 1986 [GB] United Kingdom ............... 8603392

[51] Int. Cl.[4] .............................................. G01P 15/08
[52] U.S. Cl. .................................... 73/517 R; 356/349; 356/358
[58] Field of Search ............ 73/516 R, 517 R, 862.64, 73/653, 655, 657, 705; 356/349, 358; 250/231 R

[56] References Cited

U.S. PATENT DOCUMENTS 3,517,560 6/1970 Jacobs et al. ...................... 73/517 R
4,637,255 1/1987 Martin ................................. 73/517 R

FOREIGN PATENT DOCUMENTS 2521248 12/1976 Fed. Rep. of Germany .
2633178  1/1978 Fed. Rep. of Germany .
1108835  4/1968 United Kingdom .

OTHER PUBLICATIONS

*Electronic Letters*, vol. 18, No. 5, 4th Mar. 1982, pp. 227-229, London, GB; D. A. Jackson et al.; "Confocal Fabry—Perot Sensor".

Primary Examiner—John Chapman
Attorney, Agent, or Firm—Cushman, Darby & Cushman

[57] ABSTRACT

An alternative form of accelerometer is described herein in which an acceleration sensitive element (68, 69) is coupled to a deformable reflector (60) in a lasing cavity (58) to vary the radius of curvature of the reflector in response to experienced acceleration and hence to alter the beat frequency between two transverse lasing modes in the cavity to provide an output signal indicative of the acceleration.

9 Claims, 6 Drawing Sheets

MOVEMENT SENSING

This invention relates to movement sensing and is more particularly although not exclusively concerned with accelerometers.

Currently available accelerometers generally comprise some form of mass which moves in response to acceleration experienced by the accelerometer and a transducer, for example a strain gauge, which converts that movement to an analogue electrical signal. It may be difficult to achieve sufficient accuracy with existing accelerometer designs. If a digital output is required, the analogue signal from the transducer has to be converted by an analogue-to-digital converter which may be itself a source of inaccuracy. The so-called vibrating beam accelerometer which is presently being developed provides the possibility of a direct digital output—even so, at least at present, the accuracy of such devices is modest. Particular parameters which may not be able to be rendered satisfactory with existing accelerometers are the proper alignment of the sensing axis of the accelerometer and the bias stability.

An object of the invention is to provide an alternative form of accelerometer which has the capability for a direct digital output and which may have better accuracy than the known designs.

According to one aspect of the invention, there is provided a device for sensing movement of a movable element, the device comprising:

a multi-mode laser cavity, at least one end of which is defined by a deformable reflector which is coupled to the element for its curvature to be varied in response to movement of the element; and output means for forming an output signal indicative of the curvature of the reflector and hence the movement of the element.

According to a second aspect of the invention, there is provided a device for sensing movement of a movable element, the device comprising a multi-mode laser cavity one end of which is defined by a deformable reflector, said deformable reflector being coupled to said element for its radius of curvature to be varied in response to movement of the element and thereby for the frequency difference between two laser cavity modes to be varied, the device further comprising output means for forming a signal indicative of said frequency difference.

According to a third aspect of the invention, there is provided an accelerometer comprising:

a laser cavity at least one end of which is defined by a curved reflective surface and in which, in use, at least two transverse laser modes are generated and propagated;

acceleration sensitive means operable for altering the effective radius of curvature of said curved surface in response to the acceleration experienced; and output means for providing an output signal indicative of the frequency difference between said at least two transverse modes and hence indicative of said acceleration.

Preferably, the acceleration sensitive means comprises a proof mass assembly which is coupled to one of the reflective surfaces and which assembly moves in response to the acceleration experienced thereby altering the effective radius of curvature.

According to a fourth aspect of the invention, there is provided an accelerometer comprising a multi-mode laser cavity an end of which is defined by a deformable reflector surface, an acceleration sensitive element coupled to said surface and movable, in response to acceleration experienced by the accelerometer, to vary the curvature of said surface and hence vary the inter-mode frequency spacing between the modes, the accelerometer further comprising radiation sensitive means for forming an output signal indicative of said spacing.

For a better understanding of the invention, reference will now be made, by way of example, to the accompanying drawings in which.

Figure 1:
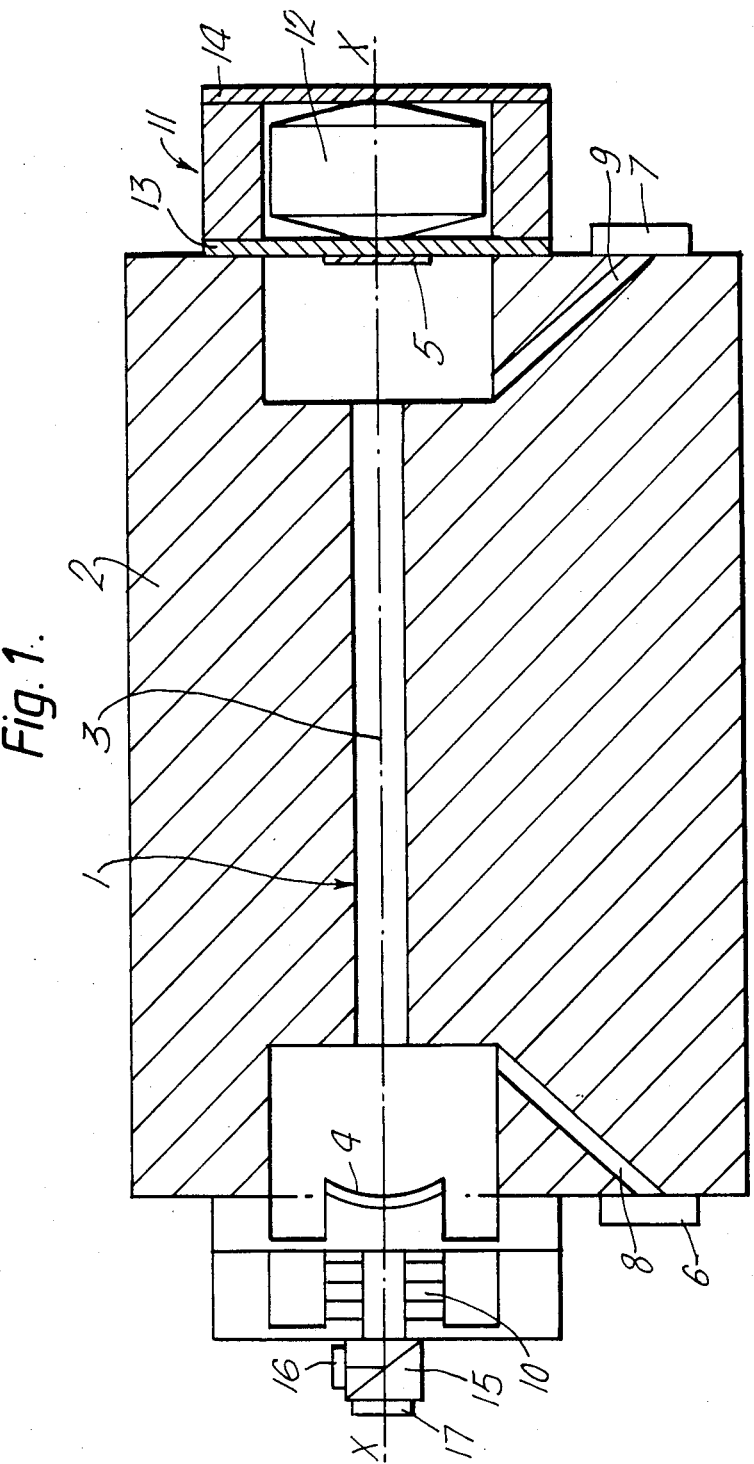
FIG. 1 is a schematic side sectional elevation of a laser-based accelerometer.

A laser-based accelerometer is shown in FIG. 1. The accelerometer comprises a linear laser 1 which is constructed in a block 2 made of a glass ceramic material eg Zerodur. The laser 1 has a laser cavity 3 which is filled with a helium-neon gas mixture which produces light having a wavelength in the 632.8 nm transition. Two mirrors, 4 and 5, one either end of the cavity 3, provide the resonating structure for the laser 1. Discharge of the gas mixture is initiated by a high voltage applied between a cathode 6 and an anode 7, the cathode and anode being connected to the laser cavity 3 by respective ducts 8 and 9. One mirror, 4, provides the output for path length control of the laser 1 and is moved backwards and forwards to accommodate changes in path length of the cavity due to temperature and acceleration changes by means of a piezo-electric actuator 10. For a block of Zerodur, there may be a path length change of $5 \times 10^{-8} L$ per °C., where L is the length of the laser cavity. For example, over a temperature range of $-40°$ C. to $+70°$ C. a path length change of $\pm 0.138$ μm may be obtained. The other mirror 5 is attached to a proof mass assembly 11, which comprises a proof mass 12 mounted between two thin flexible ceramic discs 13 and 14 which may be made of fused silica. The proof mass assembly 11 is attached to the laser 1 on an axis X—X which is parallel to the laser axis (not shown) and is known as the sensitive axis.

Mirror 4 is a highly reflective multilayer dielectric mirror which has a concave surface providing the cavity 3 with an effective radius of curvature of R to ensure correct lasing. It is 99.95% reflective and 0.05% transmissive to allow some of the light to emerge from the cavity 3. The light which emerges from the cavity 3 is passed to a beamsplitter 15 via mirror 4 where it is divided, one portion passing to a photodiode 16 which is used for path length control of the cavity 3 and the other portion passing to a high speed photodiode 17 which may be in 'avalanche' photodiode. The photodiode 17 is positioned so that it receives two frequency modes of the laser cavity 3 due to different path length, the $TEM_{00}$ and the $TEM_{01}$ modes, and hence provides an output indicative of the best frequency of these two modes. The other frequency modes generated in the lasing cavity are removed by aperturing. The best frequency obtained, $\Delta\gamma$, between the $TEM_{100}$ and $TEM_{01}$ modes depends on the effective radius of curvature R of the cavity 3, and is given approximately by $$\frac{\Delta\gamma}{\gamma} = \frac{1}{\pi} \cos^{-1}\left(1 - \frac{L}{R}\right) \quad (1)$$

where $\gamma$ is the frequency of the laser and
L is the separation of the mirrors in the laser cavity 3 as before, $\gamma$ being given by $$\gamma = \frac{c}{2L} \quad (2)$$

where c is the velocity of light ie $3\times10^8$ ms$_{-1}$ For example, if L=50 mm, $\gamma$=3000 MHz and R=10 m, $\Delta\gamma\approx$96 MHz. In the example given above, the saggital depth, s, of the concave mirror used is typically $$\frac{a^2}{2R}$$

where 2a is the diameter of the depression and a=8 mm and s=3.2 $\mu$m.

Figure 2:
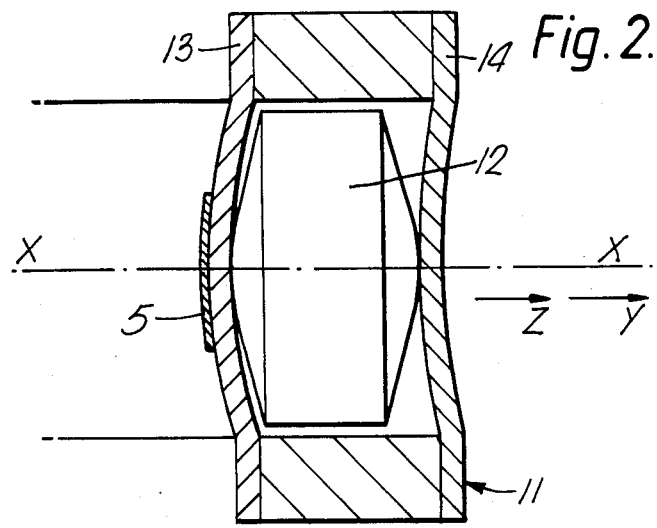
FIGS. 2 and 3 illustrate the effects of acceleration and deceleration respectively on the proof mass assembly of the FIG. 1 accelerometer.
Figure 3:
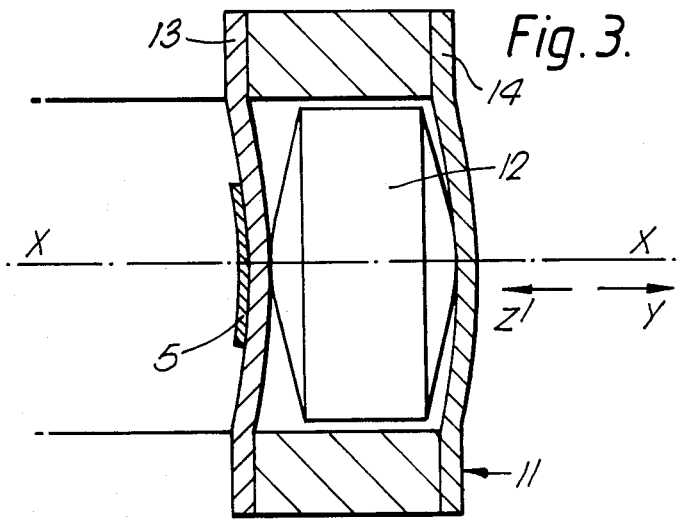

Referring now to FIGS. 2 and 3, the proof mass assembly 11 is shown under the effects of acceleration and deceleration applied along the sensitive axis X—X. The accelerometer is moving in the direction arrow Y in both figures, but in FIG. 2, the accelerometer is experiencing acceleration Z in the direction of motion Y. In this case, the mass 12 is initially forced backwards as shown. This causes the two ceramic discs 13 and 14 to become concave with respect to the direction of motion Y. The mirror 5, attached to the disc 13 becomes convex as it flexes with the disc, thereby increasing the effective radius of curvature R of the cavity 3. Similarly, when the accelerometer is moving in the direction Y but is experiencing an acceleration in the direction of Z', the mass 12 is forced forwards as shown in FIG. 3, causing the discs 13 and 14 to become convex with respect to the direction of motion Y. The mirror 5 becomes concave thereby decreasing the effective radius of curvature R of the cavity 3. The change in the effective radius of curvature R, by equation (1), gives a corresponding change in the beat frequency, $\Delta\gamma$, which can be measured directly, ie as R increases, $\gamma$ decreases and vice versa. The assembly 11 is designed to have a symmetrical sandwich structure as shown in FIGS. 1 to 3, which has a very low cross axis sensitivity due to the assembly being stiff in these axes.

Figure 4:
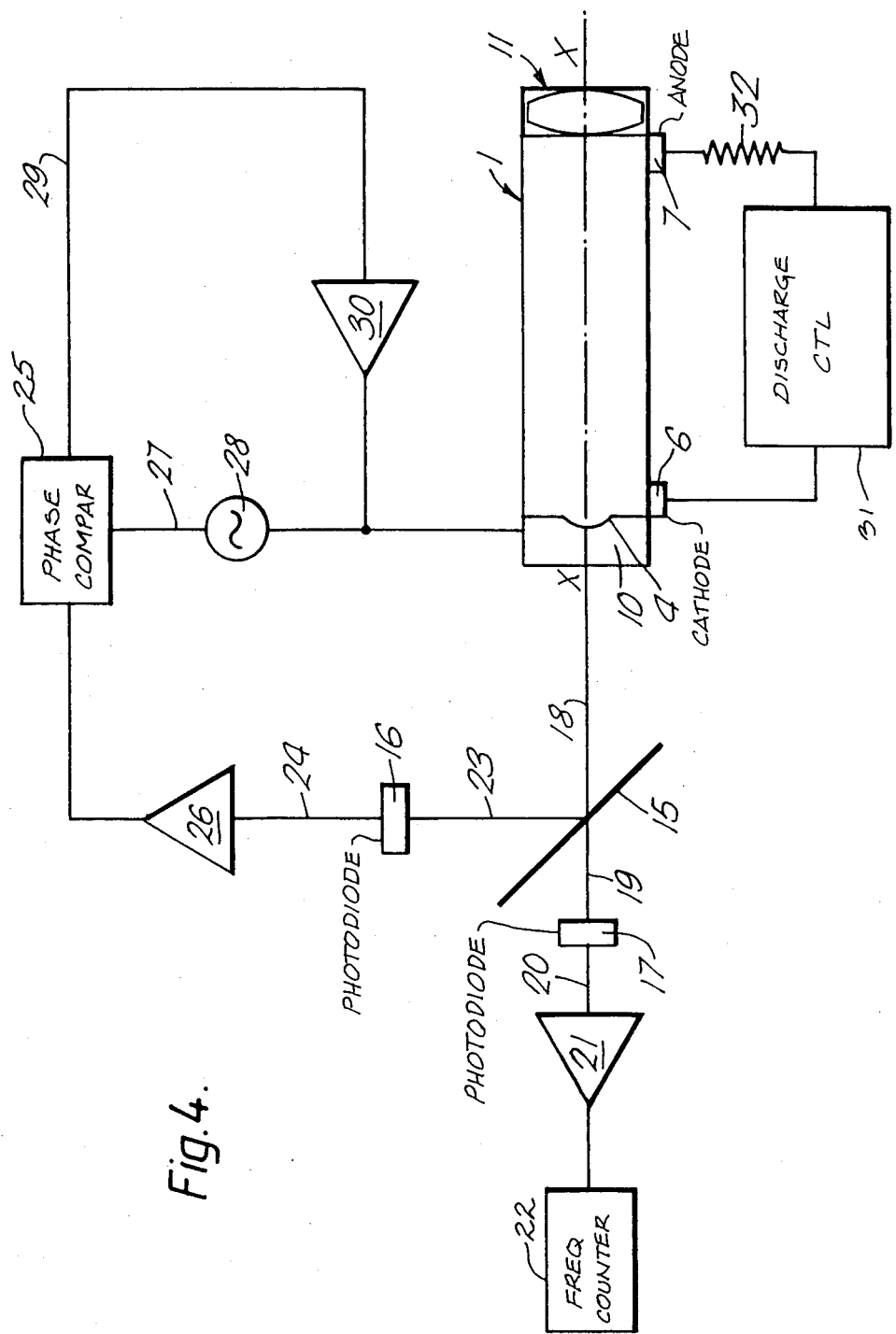
FIG. 4 is a block diagram of the processing electronics which may be used with the FIG. 1 accelerometer.

FIG. 4 is a block diagram of the processing electronics. The mirror 4 provides an output light beam 18 which is split by a beamsplitter 15 as mentioned previously. One portion 19 of the beam 18 is directed to a photodiode 17 which provides an electrical signal 20 indicative of the light incident on it. This signal 20 is then amplified by amplifier 21. The amplified signal is then passed to a frequency counter 22 which gives an output signal corresponding to the beat frequency $\Delta\gamma$ between the two modes in the laser cavity ie the $TEM_{00}$ and $TEM_{01}$ modes. As mentioned previously, the beat frequency $\Delta\gamma$ is related to the acceleration or deceleration. experienced by the accelerometer along its sensitive axis X—X. The other portion 23 of the beam 18 is directed to another photodiode 16 which provides an electrical signal 24. The signal 24 is passed to a phase comparator 25 via amplifier 26, where it is compared with a signal 27 generated by oscillator 28. The output signal 29 from the comparator 25 is then amplified by amplifier and integrator 30 and is used to control the path length control mirror 4 by way of the actuator 10. The actuator 10 is designed to move the mirror 4 without substantially changing the concavity of its suface ie there is no change in the effective radius of curvature R due to the actuator 10. The mirror 4 is therefore adjusted to maximise the laser power generated in the cavity 3. A discharge control circuit 31 excites the helium-neon gas mixture within the cavity 3 by applying a high voltage between the cathode 6 and the anode 7, and maintains a constant current value within the cavity 3 thereby providing a high degree of stability within the cavity to avoid beat frequency drifts due to changes in the dispersion of the gas and frequency pulling. A ballast resistor 32 is incorporated between the circuit 31 and the anode 7 to ensure discharge stability.

Figure 5:
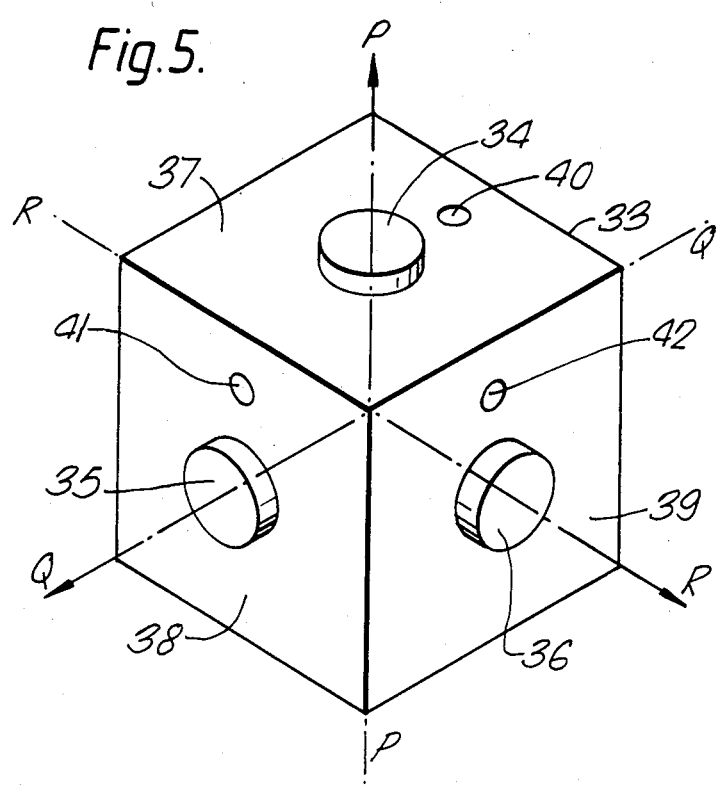
FIG. 5 is a block diagram of a triaxial laser-based accelerometer.

The accelerometer described above can be used as a single axis sensor or it may be integrated into a triaxial assembly as shown in FIG. 5. Three accelerometers are formed in a cube 33, each one having its cavity aligned with respective orthogonal sensitive axes P—P, Q—Q and R—R. Proof mass assembllies 34, 35 and 36 are mounted on three adjacent faces, 37, 38 and 39 of the cube 33 and are sensitive to acceleration along the axes as shown. This arrangement utilises a common helium-neon gas mixture which is excited by respective anode-cathode pairs for each accelerometer ie three orthogonal lasers are operating simultaneously, the anodes 40, 41 and 42 only of each pair are shown. Naturally, the triaxial assembly may be designed so that its discharge paths are such that a single anode-cathode pair may be utilised.

Figure 6:
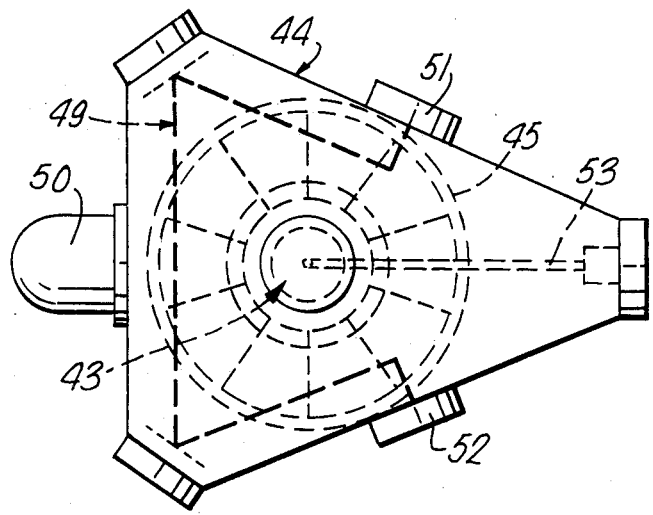
FIGS. 6 and 7 are schematic diagrams of a plan and side elevation respectively of a combined laser gyroscope/accelerometer.
Figure 7:
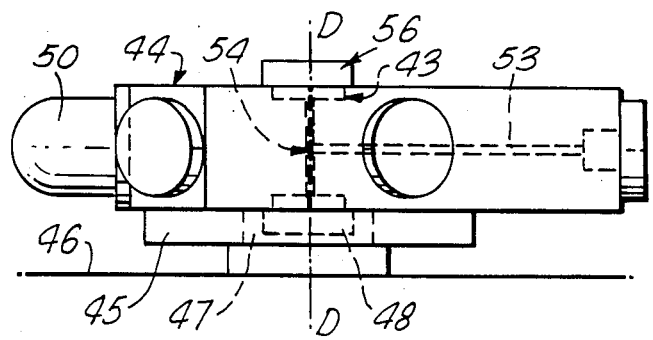

In a further embodiment, as shown in FIGS. 6 and 7, an accelerometer 43 is combined with a laser gyroscope 44 thereby providing both linear and rotational sensors. The gyroscope 44 illustrated incorporates a mechanical dither assembly which has a single dither spring 45 attached to the baseplate 46. A space 47 through the centre of the dither assembly allows the path length control mirror 48 for the accelerometer to be positioned on the dither axis D-D. By positioning the accelerometer on the dither axis, it is not subjected to accelerations ddue to dither motion. Again, a common helium-neon mixture may be used for both the accelerometer and the gyroscope but each would have its separate discharge paths, with separate anode and cathodes. The discharge path 49 for the gyroscope is shown by a thick line in FIG. 6 and passes between a cathode 50 and two anodes 51 and 52 respectively. A gas pathway 53 connects the cavity of the gyroscope 44 to the cavity of the accelerometer 43. The discharge path 54 for the accelerometer is shown by a thick line in FIG. 7, the proof mass assembly 55 being mounted at the other end of the accelerometer cavity to the mirror 48.

Figure 9:
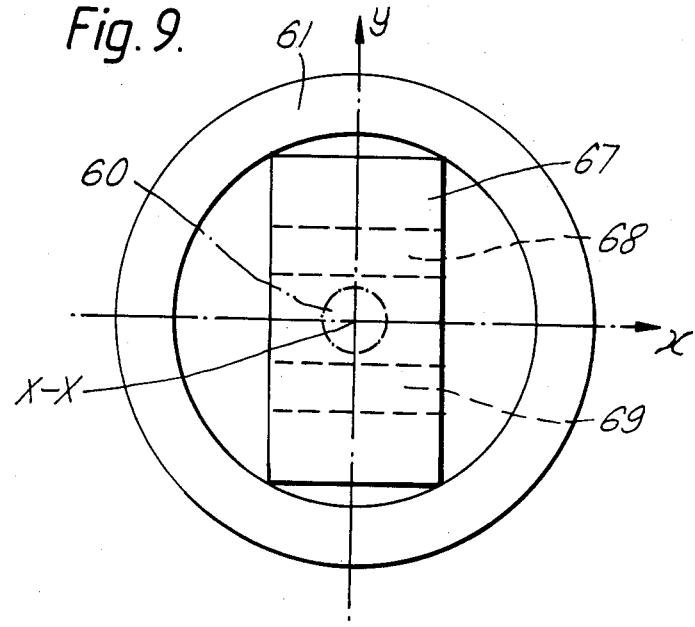
FIG. 9 is a section on IX—IX of FIG. 8.
Figure 8:
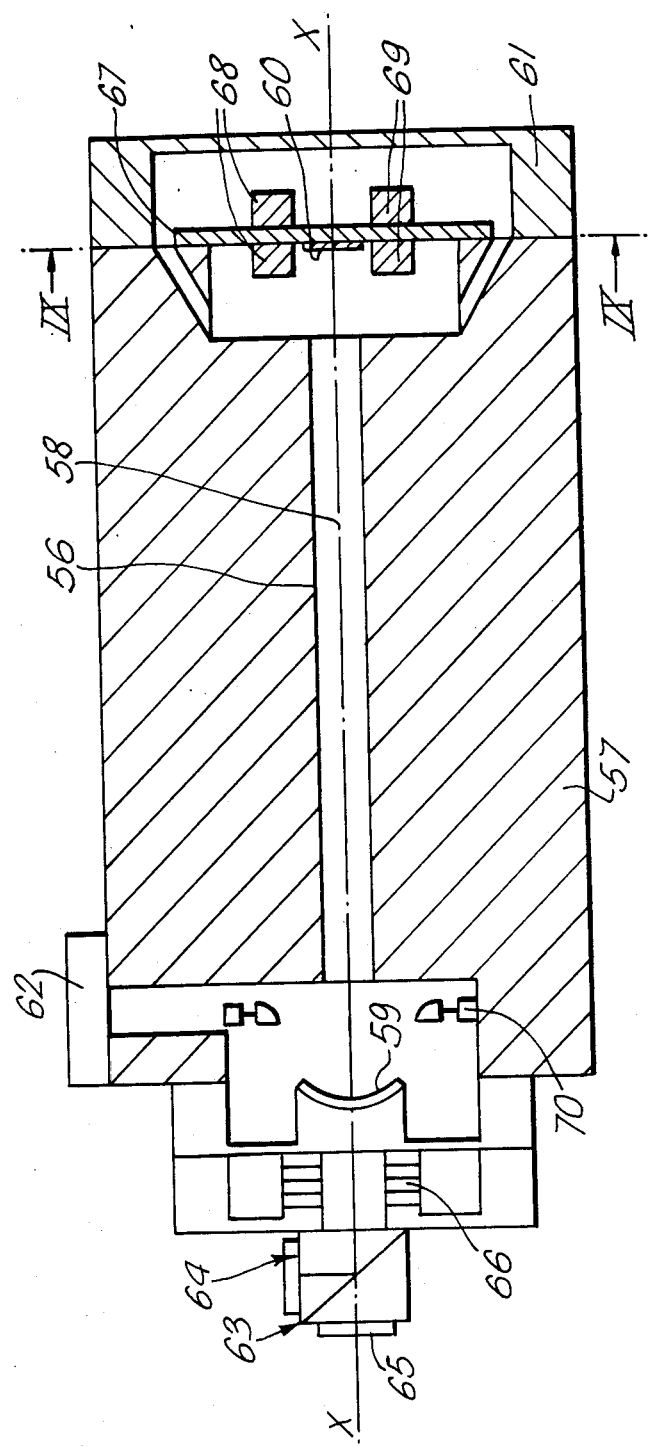
FIG. 8 is a schematic side sectional elevation of another embodiment of a laser-based accelerometer.

A further laser-based accelerometer is shown in the FIGS. 8 and 9. The accelerometer comprises a linear laser 56 which is constructed in a block 57 made of a glass ceramic materal e.g. Zerodur. The laser 56 has a laser cavity 58 which is filled with a helium-neon gas mixture. Two mirrors, 59 and 60, one either end of the cavity 58, provide the resonating structure for the laser 56. Discharge of the gas mixture is initiated by a high voltage applied between a cathode 61 and an anode 62. The mirror 59 is a highly reflective multilayer dielectric mirror which has spherical concave surface. It is partially transmissive to allow some of the light to emerge from the cavity 58. The emergent light is passed to a beamsplitter 63 where it is divided; one portion passing to a photodiode 64 which provides a signal which is used for path length control of the cavity; and the other portion passing to a high speed photodiode 65 which may be an 'avalanche' diode and whose function will be described later. The signal from the photodiode 64 is used to control a piezo-electric actuator 66 which in turn, controls the mirror 59 to move it backwards and forwards to accommodate changes in path length of the laser cavity 58 due to changes in temperature etc. The mirror 60 is a highly reflective dielectric stack which is formed on a flexible diaphragm 67. In the equilibrium position i.e. under zero acceleration conditions, the mirror 60 is plane but deforms with the diaphragm 67 when acceleration is experienced. The diaphragm 67 is positioned symmetrically about an axis X—X which is parallel to the laser axis (not shown) and which is shown as the sensitive axis. The diaphragm 67 is bonded to the block 57 using a thermally compatible bonding technique. Proof masses, 68 and 69, are attached to the diaphragm 67 so that under acceleration along the sensitive axis X—X, a deformation of the diaphgram 67 and hence the mirror 60, results. The proof masses 68 and 69, and the diaphgram 67 are also formed in Zerodur to ensure thermal compatibility with the block 57. The deformation obtained under acceleration along the sensitive axis X—X gives the mirror 60 a cylindrical curvature i.e. in the plane of the mirror 60 normal to the axis X—X, the mirror is deformed in the y-direction (as shown on FIG. 9) producing a difference in curvature in the two orthogonal directions. The $TEM_{01}$ and $TEM_{10}$ modes of the laser cavity 58 align themselves with these directions producing an optical path difference between the two modes. This optical path difference leads to a beat frequency separation which is related to the experienced acceleration.

Under zero acceleration conditions, there are three modes lasing in the cavity 58, $TEM_{00}$, $TEM_{01}$ and $TEM_{10}$ modes. The $TEM_{01}$ and $TEM_{10}$ modes have the same optical path length and hence frequency but the $TEM_{00}$ mode has a frequency which is substantially different to the $TEM_{01}$ and $TEM_{10}$ modes, e.g. a difference in frequency of around 100 MHz depending on the cavity geometry. When acceleration is experienced, a difference in optical path length and hence frequency is obtained in the $TEM_{01}$ and $TEM_{10}$ modes due to the deformation of the mirror 60 as mentioned previously. This frequency difference is detected by the photodiode 65.

The photodiode 65 is postioned to receive two frequency modes of the laser cavity which are produced by the deformation of the mirror 60 under acceleration. The two modes, as mentioned previously are the $TEM_{01}$ and $TEM_{10}$ modes and hence the photodiode 65 provides an output signal indicative of the beat frequency separation of these two modes. Other frequency modes generated in the lasing cavity are removed by aperturing.

The flexible diaphragm 67 is completely enclosed within the helium-neon gas environment. This ensure that the diaphragm 67 is not sensitive to atmospheric pressure variation, and no undesirable pressure differences exists within the arrangement.

The cathode 61 and anode 62 are sealed to the block 2 but the anode also serves das a 'fill and pinch off' tube. A getter 70 is also provided to ensure long term gas purity.

As previously mentioned, the accelerometer described with reference to FIGS. 7 and 8 may be used a single axis sensor or three such accelerometers may be integrated into a triaxial assemlby which is then used to sense acceleration in each of three orthogonal directions.

It may also be possible to combine the accelerometer of FIGS. 7 and 8 with a ring laser gyroscope thereby providing both linear and rotational sensors in a single unit.

I claim:

1. A device for sensing movement of a movable element, comprising:
    a multi-mode laser cavity, at least one end of which is defined by a deformable reflector which is coupled to said movable element such that a curvature of said deformable reflector is varied in response to movement of said element;
    means for generating modes in said cavity which are dependent on said curvature; and
    output means for forming an output signal indicative of the curvature of the reflector and hence the movement of the element based on said modes.

2. A device according to claim 1, wherein the output signal is a frequency difference between two different transverse lasing modes.

3. A device according to claim 2, wherein the two cavity modes are the $TEM_{00}$ and $TEM_{01}$ modes which have a frequency difference for the same path length.

4. A device according to claim 2, wherein the movable element includes means for changing relative radii of curvature of the reflector in two orthogonal directions across the reflector to thereby differentially vary the respective path lengths for and frequencies of the two transverse modes wherein the two cavity modes are $TEM_{01}$ and $TEM_{10}$ modes which have the same frequency for the same path length.

5. A device according to any one of claims 1 to 4, wherein the movable element is a proof mass assembly attached to the deformable reflector.

6. A device for sensing movement of a movable element, the device comprising:
    a multi-mode laser cavity, one end of which is defined by a deformable reflector, said deformable reflector being coupled to said movable element such that its radius of curvature is varied in response to movement of the element;
    means for forming modes in the laser cavity such that a frequency difference between two laser cavity modes in the cavity is varied by said radius of curvature being varied; and
    output means for forming a signal indicative of said frequency difference.

7. An acceleromter comprising:
    a laser cavity , at least one end of which is defined by a curved reflective surface;
    means for generating and propagating at least two transverse laser modes in said cavity;
    acceleration sensitive means for altering an effective radius of curvature of said curved surface in response to a sensed acceleration; and output means for providing an output signal indicative of a frequency difference between said at least two transverse modes and indicative of said acceleration.

8. An accelerometer according to claim 7, wherein the acceleration sensitive means comprises a proof mass assembly which is coupled to one of the reflective surfaces and which assembly moves in response to the acceleration experienced thereby altering the effective radius of curvature.

9. An accelerometer comprising:

a multi-mode laser cavity, an end of which is defined by a deformable reflector surface;
means for forming modes in said cavity;
an acceleration sensitive element coupled to said surface and movable, in response to acceleration experienced by the accelerometer, to vary a curvature of said surface and and to vary an inter-mode frequency spacing between the modes; and
radiation sensitive means for forming an output signal indicative of said spacing.

* * * * *